United States Patent [19]

Brice, deceased et al.

[11] 4,033,524
[45] July 5, 1977

[54] METHOD AND APPARATUS FOR CONTROLLING EARTH ORBITING SATELLITES AND VEHICLES INTER ALIA

[76] Inventors: Neil M. Brice, deceased, late of King Ferry, N.Y.; by Marilyn J. Brice, executrix, R.R. No. 1, King Ferry, N.Y. 13081

[22] Filed: Aug. 23, 1971

[21] Appl. No.: 174,048

Related U.S. Application Data

[63] Continuation-in-part of Ser. No. 164,793, July 21, 1971.

[52] U.S. Cl. .............................................. 244/158
[51] Int. Cl.² .......................................... B64G 1/10
[58] Field of Search ........... 244/1, 3.21, 3.22, 3.23, 244/62, 158; 60/202, 204, 203; 317/4, 262; 239/1, 2, 11, 14, 171; 102/3; 315/111; 250/49.5 R, 106 VC; 210/24; 55/103; 176/1, 5

[56] References Cited

UNITED STATES PATENTS

| 3,095,163 | 6/1963 | Hill | 244/62 X |
| 3,145,531 | 8/1964 | Deutsch | 244/1 S B |
| 3,325,123 | 6/1967 | Null | 244/3.21 X |
| 3,521,835 | 7/1970 | Braga-Illa et al. | 244/1 S A |

OTHER PUBLICATIONS

Stuhlinger, Ernst, "Electric Propulsion," Electrical Engineering, July, 1963, pp. 459–465.

*Primary Examiner*—Trygve M. Blix
*Assistant Examiner*—Barry L. Kelmachter
*Attorney, Agent, or Firm*—Jim Zegeer

[57] ABSTRACT

There is disclosed a method of controlling, inter alia, earth orbiting satellites and vehicles by cold plasma injection control in the magnetosphere and thereby influencing the space medium through which the satellite travels. The injection of cold plasma changes the atmospheric drag on the satellite as it traverses the earth's magnetosphere.

6 Claims, 2 Drawing Figures

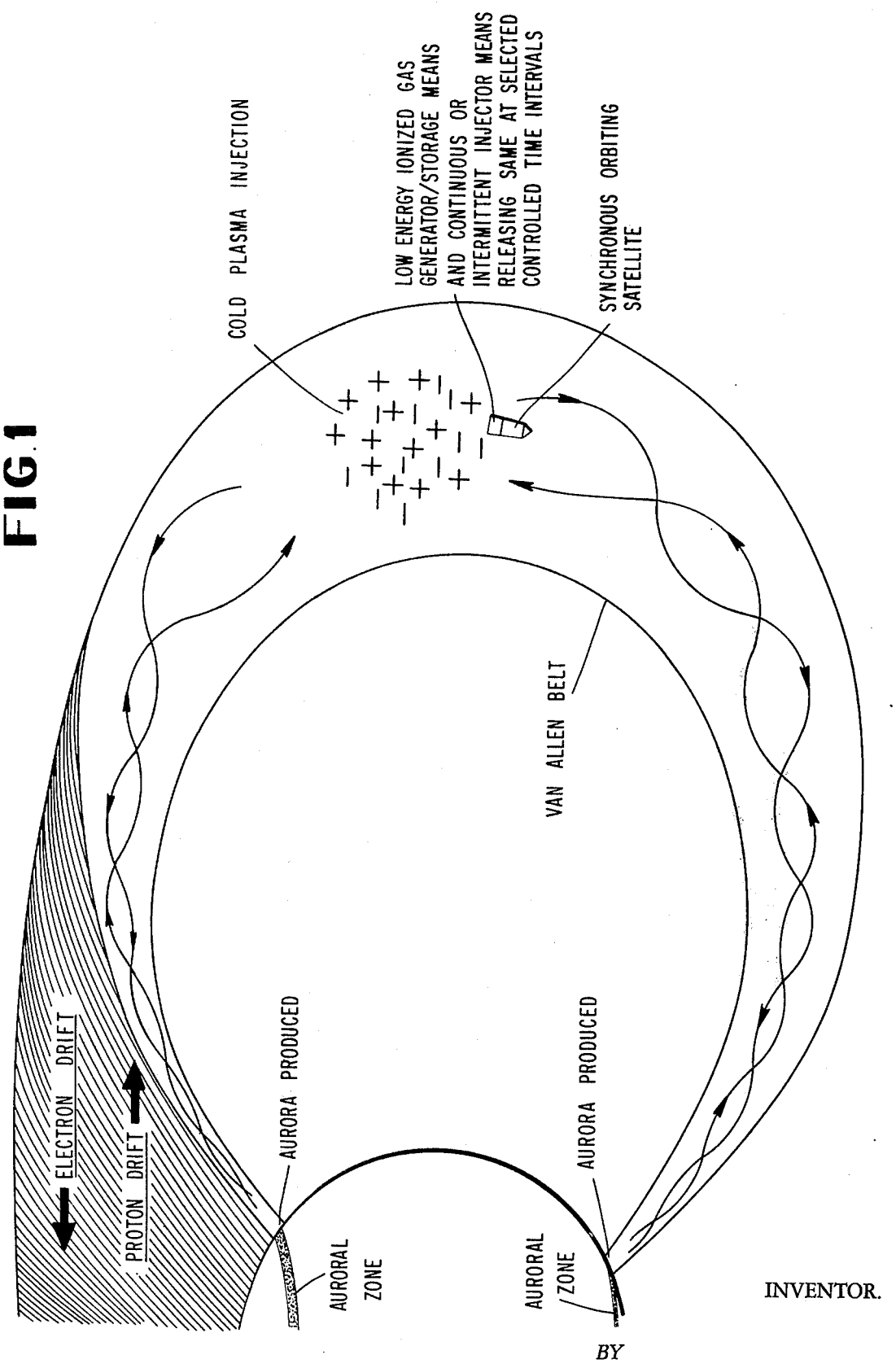

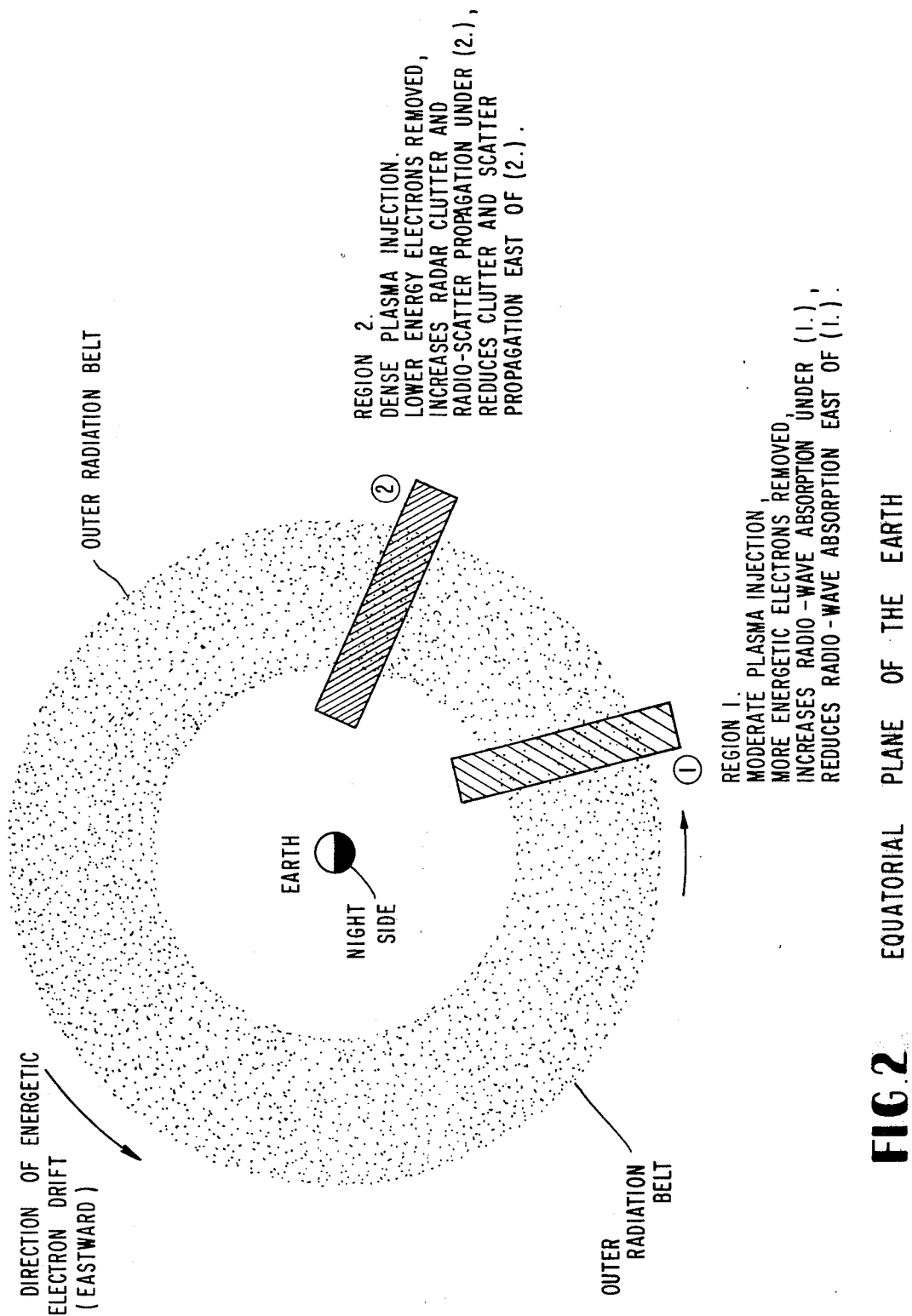
FIG. 2 EQUATORIAL PLANE OF THE EARTH

METHOD AND APPARATUS FOR CONTROLLING EARTH ORBITING SATELLITES AND VEHICLES INTER ALIA

This application is a continuation-in-part of my application filed July 21, 1971 Ser. No. 164,793 and entitled "Method and Apparatus for Producing A Controlled Change in Earth Characteristics and Measuring Earth Changes", the disclosure of which is incorporated herein in its entirety by reference.

Control of energetic charged particles trapped in the earth's magnetic field is achieved by cold plasma (i.e. low-energy ionized gas or particles) injection in amounts significantly larger than the amounts of low energy gas or charged particles which is naturally present and entering the magnetosphere.

FIG. 1 of the attached drawing shows a partial equatorial section of the earth and the high intensity radiation field trapped therein by the earth's magnetic field and FIG. 2 is an equatorial plane showing various cold plasma injection sites and times (relative to earth night).

It is well known that ionized particles have a strong tendency to follow magnetic field lines. In the absence of perturbations with periods comparable with the particle gyration period, the angle between the particle trajectory and the magnetic field, $\alpha$, is governed by the equation $\sin^2\alpha/B = $ constant, where $B$ is the magnetic field strength. Energetic charged particles in the radiation belts are trapped when their "pitch angle", $\alpha$, is sufficiently large at large distances where the magnetic field is weak. They are reflected back away from the earth at a value of the magnetic field for which $\alpha$ becomes 90°. If, $\alpha$ is very small, the particles approach close to the earth, and are lost through collisions with atmospheric constituents before they are reflected. Since particles with small pitch-angles are rapidly removed, there is an inherent anisotropy in the trapped energetic particles with more particles traveling normal (perpendicular) to the magnetic field than parallel to it.

This anisotropy leads to plasma instabilities and amplification of some electromagnetic waves propagating in the region of the radiation belts. In the amplification process, the average pitch angle of the particles resonating with the waves is reduced, as the effect of the waves is to randomize the particle pitch angle, and hence remove the anisotropy. The decrease in pitch angle causes some particles which were previously trapped to penetrate down to the atmosphere and be lost. The ratio of the energy precipitated into the atmosphere to the energy transferred from the particles to the waves is roughly the ratio of the particle cyclotron frequency, $\Omega$, to the wave frequency, $\omega$, in the interaction region. This ratio is typically in the range 2 – 10. The waves in question are at frequencies less than, but comparable with, the particle cyclotron frequency. Most of the amplification takes place in and near the equatorial plane where, for a given magnetic field line, the magnetic field strength (and hence particle cyclotron frequency) are smallest. The waves that are amplified also tend to follow the magnetic field lines toward the earth. Some of the wave energy is reflected back into the interaction region and amplified again. If the gain in wave amplitude in the interaction region more than compensates for the reflection loss, the wave amplitude rapidly increases. The amount of wave gain is, however, proportional to the number of energetic particles resonating with the wave, and amplification of waves leads to removal of particles. The very large wave amplitudes produces as described above rapidly reduce the number of trapped energetic particles to the point where the gain in wave energy in the interaction just balances the reflection loss. This provides an upper limit to the number of energetic particles which may be stably trapped.

It is readily shown that there is an upper limit to the wave frequencies which may be amplified ($\omega$ max), given by $$\frac{\omega \text{ max}}{\Omega} = \frac{A}{A+1}$$

for energetic electrons, where $A$ is the anisotropy.

The particles which resonate with the wave are those whose velocity causes them to see the wave frequency doppler-shifted to their cyclotron frequency $$\Omega = \omega + k V_{11}$$

where $k$ is the wave number and $V_{11}$ the particle velocity anti-parallel to the wave. There is thus a minimum parallel velocity and corresponding minimum parallel particle energy at which wave growth occurs. Particles with lower energies do not give wave amplification, and hence are not precipitated into the atmosphere by this process. There is thus a threshold energy below which the "stable trapping limit" does not exist and at energies below this threshold very large fluxes of energetic particles can and do exist. The threshold energy depends on the wave number squared, $k^2$, and this is proportional to the plasma frequency squared, which in turn is proportional to the total ionization density, N ("cold" and energetic particles). It may be shown that the threshold particle energy is a few times the magnetic energy per particle, $B^2/2\mu_o N$, where $\mu_o$ is the permeability of free space and N is the plasma density. In order to precipitate a substantial fraction of the energetic particles, the mean particle energy ($<E>$) should be comparable with or greater than the threshold energy $E_{th}$, $$<E> \geq E_{th} \approx (3 \text{ to } 10) \frac{B^2}{2\mu_o N}$$

Measurements of energetic particles, magnetic field strength, $B$, and plasma density, $N$, in the regions of the radiation belts show (not unexpectedly) that the bulk of the energetic particles energy resides in particles whose energy is below the threshold energy. The plasma densities measured are generally in the range 0.1 to 10 per $cm^3$ in the equatorial plane in the outer radiation belt. The total amount of plasma above 1000 km in a magnetic flux tube which maps down to an area of 1 $cm^2$ at 1000 km (the flux-tube content per $cm^2$) is typically $10^{12}$ to $10^{13}$ with extreme values perhaps a factor of three smaller or larger.

ARTIFICIAL MODIFICATION OF THE INSTABILITY AND PRECIPITATION PROCESS

From these numbers, it is seen that it is not difficult to substantially increase the plasma density through injection of ionized gas from a rocket or satellite (or, conceivable, a gun). One Kgm mole of ionized gas (2.2 pounds of hydrogen) would give 6 $10^{26}$ electrons and ions, and could increase the plasma density by 10 per cc over a volume of $6.10^{25}$ cm$^3$. As another example, the flux tube content could be increased by $6.10^{12}$ per cm$^2$ over an area in the ionosphere 10 Km wide in longitude and 10° in latitude. The 10° latitude from 60° to 70° magnetic maps along field line to the range 4 to 8.5 earth radii in the equatorial plane and covers the distance at which most of the energy in the radiation belts is normally found. Since the energetic trapped particles drift in longitude (electrons eastward and ions westward to form a ring current) all of the particles cross a single longitude one per drift orbit around the earth. The drift period is typically 0.5 - 3 hours. Thus if the energy threshold for stable trapping were greatly reduced at one longitude by cold plasma (ionized gas) injection, the energetic particles would be removed as they reached this longitude in their drift around the earth. Most of the energy in the radiation belt particles could then be removed on a time scale of a drift period, i.e. a few hours. Further, since the energy input into the radiation belts would not be significantly affected, if essentially all of the energy were precipitated in one localized region, this would eliminate (or substantially decrease) precipitation of these particles at other locations, i.e., to some extent both the time and the location at which energetic particles precipitate can be controlled through plasma injection, as well as the energy of the precipitating particles. The average energy input of energetic particles into the atmosphere is about $10^{10}$ - $10^{11}$ Watts. In controlling the energy, one would also control the generation of wave energy at very low and extremely low frequencies, with the radiated wave energies of the order of 1000 to 10,000 megawatts. The optimum plasma densities can be readily calculated if the particle energies and magnetic field strength are measured.

EFFECTS ASSOCIATED WITH PRECIPITATION

Several effects are associated with the precipitation process. The precipitation of energetic protons leads to some luminosity (stable auroral red arcs or SAR-arcs) and heating of the ionosphere and thermosphere, and is associated with disruptions of radio communications which use radio reflection from the ionosphere. Following a major magnetic storm, energetic protons are found in large numbers at distances as small as two earth radii in the equatorial plane, and consequently cause disruptions in radio communications at middle latitudes as they precipitate. These effects can persist as long as a week (which is the time required to increase the equatorial plasma density, N, to its pre-storm value by evaporization of ionization out from the ionosphere.) Heating can, in turn, lead to changes in the high-altitude circulation as the heated regions expand and this give rise to high-altitude winds. Also, the precipitation process is associated with emission of very large amounts of radio waves at frequencies of the order of 1 Hz, in and near the magnetic equatorial plane.

Electron precipitation also has several associated effects. The precipitation process gives generation of very low frequency radio emission at frequencies of the order of 1 kHz, and the precipitation causes excitation of atmospheric constituents and hence visible aurora.

The more energetic electrons (a few tens of kV) produce substantial amounts of ionization by impact with atoms and molecules in the height range about 80-90 km. This ionization causes absorption of radio waves and hence communication blackouts.

Lower energies (a few kV) ionize particles at higher altitudes (about 100 - 120 km) and irregularities in this ionization can lead to scatter of radio waves and hence enhanced radio propagation via radio-scatter circuits. Ionization in this altitude range markedly effects the conductivity of the ionosphere and hence the electric fields and the large-scale dynamic motion of the magnetosphere (the outermost ionized atmosphere). Modifying the conductivity would also change the electric currents flowing in the ionosphere and hence produce magnetic perturbations at and below the surface of the earth. Most of the electron energy is deposited eventually as heat in the upper atmosphere, with consequences for atmospheric circulation similar to those for protons.

The magnetic field of the earth represents a magnetic mirror or bottle in which energetic particles may be trapped, and the Van Allen radiation belts represent a reservoir of such particles. The energy contained in this belt is very substantial indeed (about $10^{17-18}$ Joules).

Because particles with trajectories directly along the magnetic field (or very nearly so) at large distances "escape" by precipitation into the atmosphere, the energetic particle velocity distributions are inherently anisotropic with fewer particles moving along the magnetic field than normal to it. The anisotropies lead to growth (amplification) of electrostatic and electromagnetic waves at large distances, and these in turn influence the energetic particle anisotropies. Their effect is to tend to randomize the energetic particles, increasing the number traveling nearly parallel to the magnetic field and hence leading to precipitation of particles into the atmosphere. The precipitation may be controlled by changing the propagation conditions for the waves by controlled injection of ionized gas (plasma) or vapor which is readily ionized by sunlight.

The precipitation of particles into the atmosphere produces heat, light, and ionization. The light is manifest as auroral luminosity. The ionization in the atmosphere changes the electrical conductivity and this in turn influences the electric field and the large scale dynamical motion of the outer atmosphere. The heating in the upper atmosphere causes winds outward from the heated region and also upward expansion of the heated atmosphere. This, in turn, changes the atmospheric "drag" on satellites, thereby changing their orbital parameters. This is particularly important for navigational systems using satellites.

By changing the wave propagation conditions and hence the loss rates from the radiation belts, a measure of control over the densities in the radiation belts may be achieved. Also, the electrostatic waves tend to change the energy distribution of the particles, increasing the fluxes of particles at higher energies and decreasing fluxes at lower energies. Thus cold plasma injection in accordance with the invention may be used to "produce" large fluxes of energetic particles in the radiation belts.

There are three distinct ways of producing the necessary cold (i.e., low energy) ionized gas. The first is to carry in a rocket, satellite or gun projectile some ionizable material. This could ionized by any of several techniques (electric discharge, or heat, for example) and then released. Alternately, material which is readily ionized in sunlight (such as Barium vapor) could be released into sunlit regions.

The third technique uses photoelectrons emitted from the sunlit surface of the projectile or satellite. The object naturally accumulates a large flux of energetic electrons (typically about $10^9$ per $cm^2$ of collecting area). Since the net charge on the satellite can change by only very small amounts, the number of photoelectrons released is essentially equal at all times to the number of energetic electrons collected. The photoelectrons have energies of about 1 eV compared with $10^2$ to $10^4$ for the energetic electrons. Thus the photoelectron velocity is much less than the energetic electrons. It takes longer to drift away from the satellite or rocket and therefore there is an increase of electron density near the satellite. Some experimentation would be required to determine how large (surface area exposed) a satellite would be required. However, the invention contemplates, in this regard, a variable area satellite or a satellite towing a variable surface area device such as a balloon, foil roll etc. The rate at which photoelectrons are emitted is essentially the flux of energetic electrons per unit area multiplied by the collecting area of the satellite. If the satellite is in the shadow of the earth, it will not emit photoelectrons, but the same number of low energy electrons could then be released by an electron gun, thermionic cathode or other controllable electron emitter.

While the invention has been particularly shown and described with reference to the preferred embodiment thereof, it will be understood by those skilled in the art that the various changes in form and details may be made therein without departing from the scope and spirit of the invention.

What is claimed is:

1. A method of changing the orbital parameter of an earth orbiting satellites traversing the earth's magnetosphere, which comprises the step of inducing an artificial atmospheric drag on the satellite by causing a precipitation of charged particles from the earth's radiation belt.

2. The method of claim 1 wherein said step of inducing includes injecting a cold plasma into the earth's magnetosphere.

3. The invention defined in claim 2 wherein said cold plasma is an effective amount of hydrogen gas.

4. In a navigational system using an earth satellite, an earth orbiting satellite means and means for artifically changing the atmospheric drag on said satellite as it traverses the earth's magnetosphere without a structural change on the satellite means which includes a cold plasma injection means.

5. The invention in claim 4 wherein said cold plasma injection means includes a synchronous satellite.

6. The invention defined in claim 4 wherein said cold plasma is an effective amount of hydrogen gas.

* * * * *